United States Patent
Bickerstaff et al.

(10) Patent No.: US 11,354,821 B2
(45) Date of Patent: Jun. 7, 2022

(54) IMAGE PROCESSING METHOD AND APPARATUS

(71) Applicant: Sony Interactive Entertainment Inc., Tokyo (JP)

(72) Inventors: Ian Henry Bickerstaff, London (GB); Andrew Damian Hosfield, London (GB); William John Dudley, Santa Cruz (ES); Nicola Orrù, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 14 days.

(21) Appl. No.: 16/855,214

(22) Filed: Apr. 22, 2020

(65) Prior Publication Data
US 2020/0342631 A1    Oct. 29, 2020

(30) Foreign Application Priority Data
Apr. 29, 2019  (GB) ..................... 1905963

(51) Int. Cl.
*G06T 7/90*  (2017.01)
*G06T 7/194*  (2017.01)
*G06T 7/73*  (2017.01)

(52) U.S. Cl.
CPC ............ *G06T 7/90* (2017.01); *G06T 7/194* (2017.01); *G06T 7/74* (2017.01); *G06T 2207/10024* (2013.01)

(58) Field of Classification Search
CPC combination set(s) only.
See application file for complete search history.

(56) References Cited

U.S. PATENT DOCUMENTS

| 7,006,155 | B1 | 2/2006 | Agarwala | |
| 8,081,821 | B1* | 12/2011 | Schaem | H04N 9/75 |
| | | | | 382/173 |
| 2011/0008017 | A1* | 1/2011 | Gausereide | H04N 5/272 |
| | | | | 386/280 |

(Continued)

FOREIGN PATENT DOCUMENTS

JP        06339150 A       12/1994

OTHER PUBLICATIONS

Jue Wang,"An Iterative Optimization Approach for Unified Image Segmentation and Matting," Dec. 5, 2005, Tenth IEEE International Conference on Computer Vision (ICCV'05) vol. 1, pp. 1-7.*

(Continued)

*Primary Examiner* — Omar S Ismail
(74) *Attorney, Agent, or Firm* — Matthew B. Dernier, Esq.

(57) ABSTRACT

An image processing method includes detecting, for image positions in an input image, the presence of a predetermined key colour; generating an image texture, the generating step comprising: setting a texture background of the image texture to a predetermined background colour; generating transparency values at image positions of the image texture, the transparency value at an image position being dependent upon a detected property of the predetermined key colour in the input image, the transparency values; and providing a texture foreground of the image texture; and applying the image texture to the input image at image positions at which the predetermined key colour is present.

12 Claims, 5 Drawing Sheets

(56) References Cited

U.S. PATENT DOCUMENTS

2014/0109231 A1* 4/2014 Takaoka .................. G06F 21/60
726/26
2015/0347845 A1* 12/2015 Benson .................. G06V 10/28
382/103

OTHER PUBLICATIONS

Anselm Grundhöfer,"Color invariant chroma keying and color spill neutralization for dynamic scenes and cameras," May 13, 2010, The Visual Computer vol. 26,pp. 1168-1174.*
Yagiz Aksoy,"Interactive High-Quality Green-Screen Keying via Color Unmixing,"Jul. 16, 2017,ACM Transactions on Graphicsvol. 36Issue 4Aug. 2017 Article No. 61bhttps://doi.org/10.1145/3072959.2907940, pp. 152:1-152:12.*
Combined Search and Examination Report for corresponding GB Application No. GB 1905963.3, 2 pages, dated Oct. 8, 2019.

* cited by examiner

FIG. 8

IMAGE PROCESSING METHOD AND APPARATUS

BACKGROUND

Field

This disclosure relates to image processing methods and apparatus.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Chroma key compositing (otherwise known as colour separation overlay) is a technique for combining two or more images based upon the presence of a so-called key colour in one of the images. A foreground object, for example a person, is captured in front of a generally single-coloured background. the coloured background is detected in the captured image and replaced by other image material. The technique is often known informally as a "green screen" technique (although the key colour may be any predetermined colour unlikely to appear in the foreground object, such as green or blue which are generally uncommon in skin tones).

SUMMARY

The present disclosure provides an image processing method comprising:

detecting, for image positions in an input image, the presence of a predetermined key colour;

generating an image texture, the generating step comprising:

setting a texture background of the image texture to a predetermined background colour;

generating transparency values at image positions of the image texture, the transparency value at an image position being dependent upon a detected property of the predetermined key colour in the input image, the transparency values; and providing a texture foreground of the image texture; and applying the image texture to the input image at image positions at which the predetermined key colour is present.

The present disclosure also provides apparatus comprising:

a detector configured to detect, for image positions in an input image, the presence of a predetermined key colour;

a texture generator configured to generate an image texture by setting a texture background of the image texture to a predetermined background colour; generating transparency values at image positions of the image texture, the transparency value at an image position being dependent upon a detected property of the predetermined key colour in the input image, the transparency values; and providing a texture foreground of the image texture; and a processor to apply the image texture to the input image at image positions at which the predetermined key colour is present.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE PREFERRED EMBODIMENTS

Figure 1:
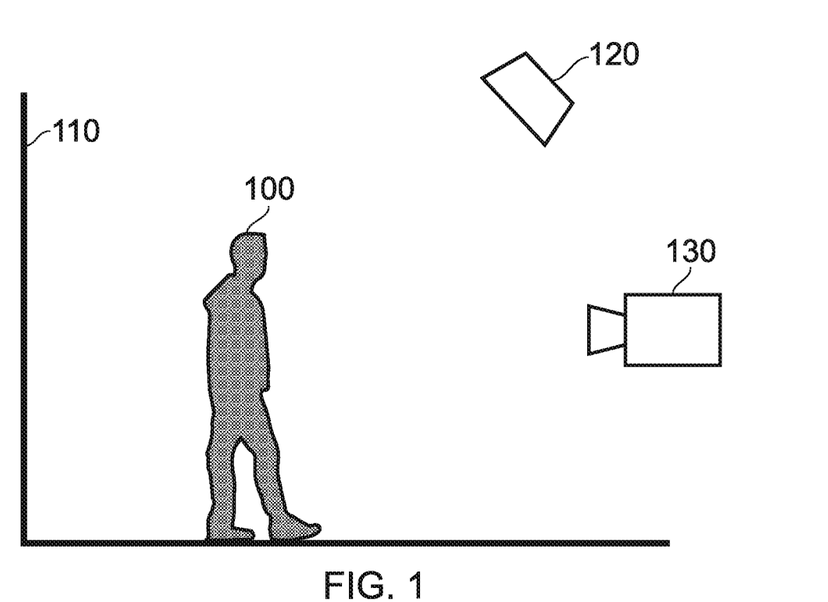
FIGS. 1 and 2 schematically illustrate a chroma key compositing image capture operation.
Figure 2:
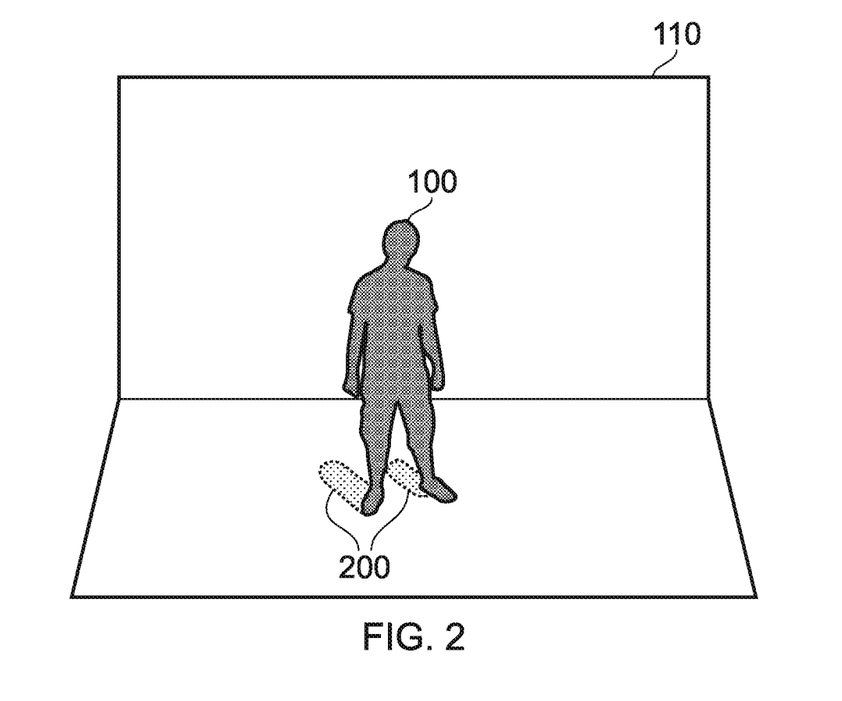

Referring now to the drawings, FIGS. 1 and 2 schematically illustrate a so-called chroma key compositing (or colour shift overlay) image capture operation.

Here, a subject 100 such as an individual actor is positioned in front of a coloured background 110 often referred to colloquially as a "green screen" (though it is noted that key colours other than green may be used; colours which tends not to occur in skin tones, such as green or blue, are considered useful for this purpose). The subject 100 is illuminated by one or more light sources shown schematically as light sources 120 (though the light source could be provided as, for example, a window to allow ambient light in) and images are captured by one or more cameras 130.

The captured images will show the subject 100 against a green (or other predetermined key colour) background. In subsequent image processing, regions or pixels formed of the key colour are identified and may be substituted by other image material, so that the subject 100 appears to be in front of or surrounded by the other (substituted) image material.

Embodiments of the present disclosure concern the handling of shadows such as those shown schematically as shadows 200 in FIG. 2 in the chroma key compositing process and can provide equivalent "shadow" effects in a chromakey composited image.

Concerning FIG. 2, the shadow regions 200, formed by at least a partial shadow being cast by the one or more light sources 120, represent portions of the image having the key colour (for example, green) but at a potentially different brightness to other areas of the key colour in the captured image. That is to say, the colour represented by the shadow regions 200 may be of the same hue as other captured regions of the key colour, but its brightness, as represented for example in a hue-saturation-brightness model by a notional mixture of the key colour with black, may be slightly different. In the subsequent image processing, however, it is still recognisable by the image processing as the key colour.

Shadows may be cast, as in the example of FIG. 2, on a "floor" portion of the coloured background, or on or by other objects within the chroma key environment, noting that the objects themselves may be coloured in the key colour so that their surface appearance can also be altered by the chroma key compositing process. An example of shadows formed on and by such an object is provided in the discussion below relating to FIGS. 5a-5g.

Therefore FIGS. 1 and 2 provide an example of the use of a background screen 110 of the predetermined key colour disposed so that an image subject is captured in front of the background screen; and a lighting arrangement 120 to illuminate the image subject.

Figure 3:
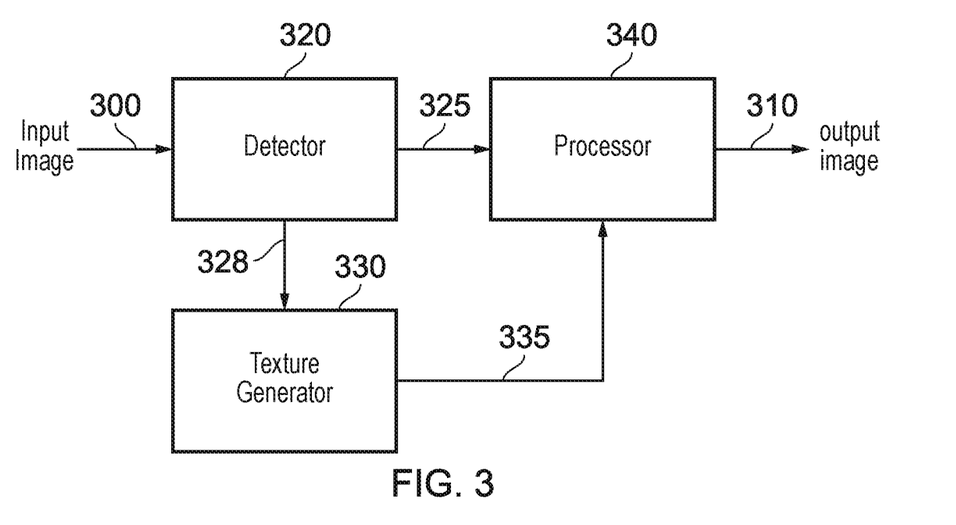
FIG. 3 schematically illustrates an image processing apparatus.

FIG. 3 schematically illustrates an image processing apparatus configured to receive an input image 300, for example an image captured by the camera 130 of the example scene shown in FIGS. 1 and 2, to apply chroma key compositing, and thus to generate an output image 310 representing the subject 100 in front of a substitute applied background. In the example of FIG. 3, the chroma key compositing process makes use of so-called image textures.

An image texture in the present context comprises, on a pixel-by-pixel or primitive-by-primitive basis (where a primitive comprises a portion of the image such as a polygon of pixels, where the set of all primitives is contiguous so as to fill the entire image):
- a background image;
- a foreground image; and
- a set of transparency or alpha values, one for each pixel or primitive, indicating a transparency of the corresponding portion of the foreground image. A zero transparency indicates that the foreground image will, at that image position, entirely mask the background image. A maximum transparency (for example represented as 1.0 in a transparency scale of 0-1) indicates that at that image position, the foreground will not be seen but the image position will represent the background.

Returning to FIG. 3, a detector 320 detects image positions at which the key colour is present in the captured input image 300 and generates an output 325 representing those portions of the input image 300 other than portions at which the key colour is present, and a control output 328 representing at least those portions of the input image 300 at which the key colour is present, along with the detected brightness (as an example detected property) of the key colour at those image locations. Using at least this information 328 and possibly other information to be discussed below, a texture generator 330 generates a texture 335 which is provided, along with the output 325 of the detector 320, to a processor 340 which combines the signal 325 with the texture 335 to generate the output image 310. A worked example of this combination process will be discussed below with reference to FIGS. 5a-5g.

Figure 4:
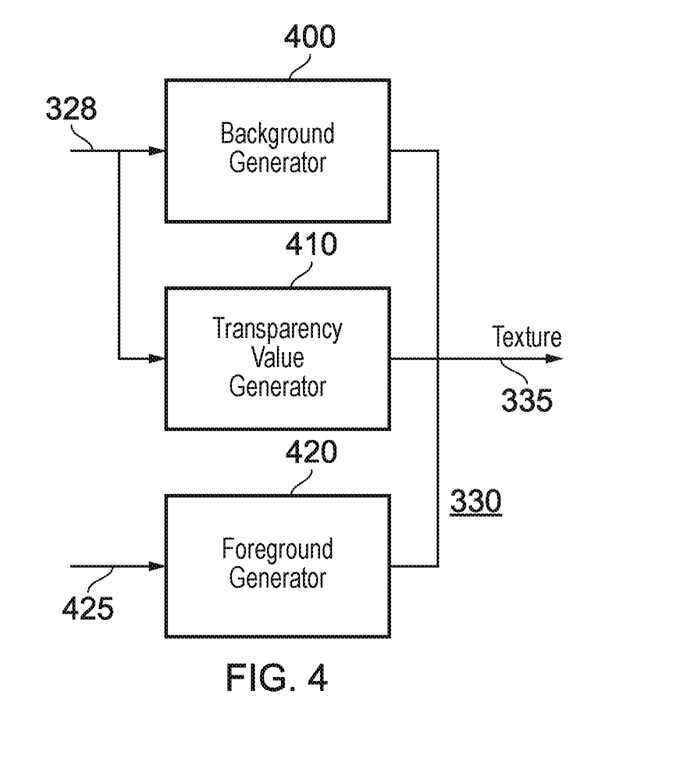
FIG. 4 schematically illustrates a texture generator.

In more detail, the texture generator 330 comprises: a background generator 400 responsive to the signal 328 to set the texture background to a predetermined background colour (such as black or dark grey) only at image positions at which the key colour is not detected by the detector 320 in the input image 300.

A transparency or alpha value generator 410 is also responsive to the signal 328, for example to set the transparency value to indicate complete transparency (0 in the example scale discussed above) at image positions at which the key colour is not detected.

A foreground generator 420 generates an image foreground for the texture 335. In some example applications, the present techniques are used as part of computer game processing or authoring so that the foreground generator 420 generates an image foreground in response to computer game controls and/or environmental conditions 425 provided by, for example, one or more user controls and/or a computer game engine (not shown in FIG. 4). Therefore, for example the foreground generator 420 can make use of execution of a computer game program to generate the texture foreground representing a computer game environment The outputs of the generators 400, 410, 420 combined to form the texture 335.

Turning now to a worked example in FIGS. 5a-5g, FIG. 5a schematically represents the input image 300. Features which can be seen in FIG. 5a include: the subject 100, a region 500 of the key colour (representing a captured image of the background 110), an object 510 which is coloured in the key colour, and shadow regions 520 formed in part on the background 110 and in part on or by the object 510.

Figure 5A:
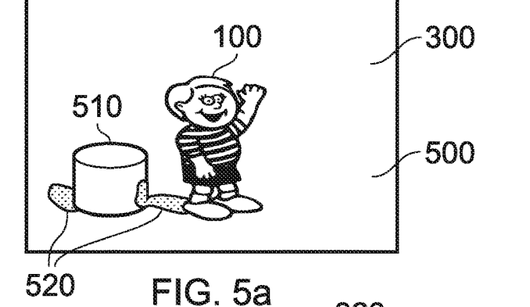
FIGS. 5a-5g schematically illustrate example images.
Figure 5B:
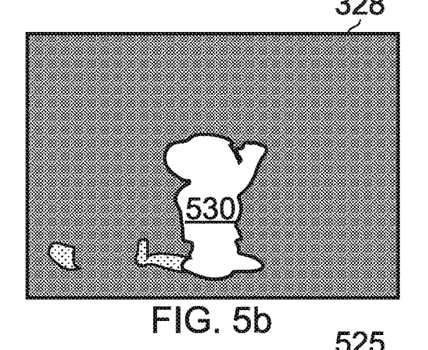

FIG. 5b schematically represents the signal 328 representing (by a white coloured region 530 in this schematic example) a portion in which the key colour was not detected, and representing (by grey or black regions in this schematic example) portions at which the key colour was detected, with the brightness of the key colour at each image location being represented by the shade of grey or black, so that in this schematic representation black represents the greatest key colour brightness detected within the input image 300 and different levels of grey represent brightness is less than the greatest detected brightness in the image. In this example regions of the greatest detected brightness of the key colour indicate no shadow, and regions of lesser brightness than the greatest detected brightness of the key colour are taken to indicate a shadow portion.

Figure 5C:
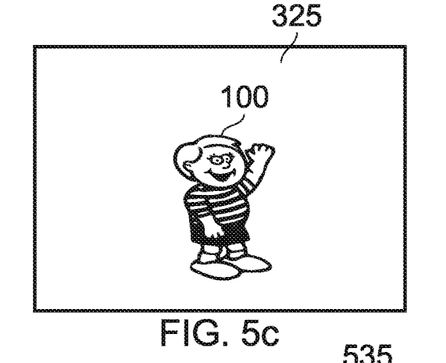

FIG. 5c schematically represents the signal 325, namely portions of the input image 300 other than those at which the key colour is detected by the detector 320. In this example, this relates only to the subject 100.

Figure 5D:
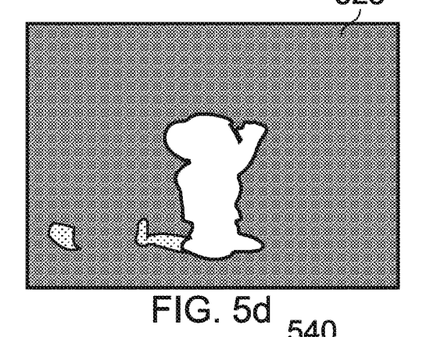

Turning now to the operation of the texture generator 330, FIG. 5d schematically illustrates the transparency or alpha values 525 generated by the transparency value generator 410, in which the central (white) region of the representation of FIG. 5d, corresponding to the location of the subject 100, is set to maximum transparency (1.0) so that the texture foreground is not visible at locations corresponding to the location of the subject 100. At other locations, the transparency is set either to 0 (represented in the diagram by the black region) or, at the grey regions where shadow portions are represented, to a value of between 0 and 1, for example 0.5, so that at those regions, the foreground image is partly transparent and the black or dark grey background of the texture will partly show through, therefore representing a shadow region in the final image.

Figure 5E:
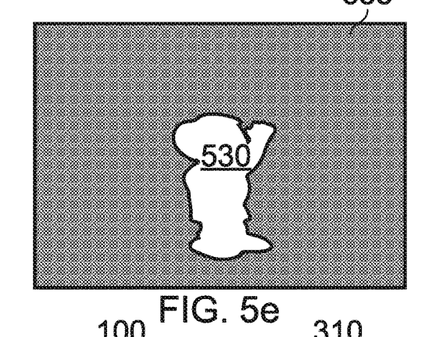

FIG. 5e schematically represents the texture background 535 established by the background generator 400, which is set to the predetermined background colour (for example, black or dark grey) everywhere except locations 530 at which the key colour was not detected. So, using this approach, shadow effects generated by the present techniques can be applied anywhere except image portions relating to the subject 100.

Figure 5F:
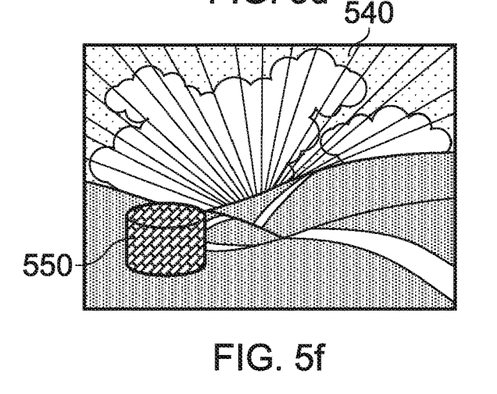

FIG. 5f schematically represents a foreground image 540 generated by the foreground generator 420. Note that this is referred to as the "foreground" of the texture even though in the context of the chroma key composited output image 310, the texture foreground is in fact primarily inserted as a replacement image background as though behind the subject 100. Note that a texture foreground region 550 is provided as a texture of the object 510 in FIG. 5a.

The application of the texture foreground by the processor 340 involves applying the texture background and the texture foreground; and setting a transparency of the texture foreground at an image position in response to the transparency value at that image position.

Figure 5G:
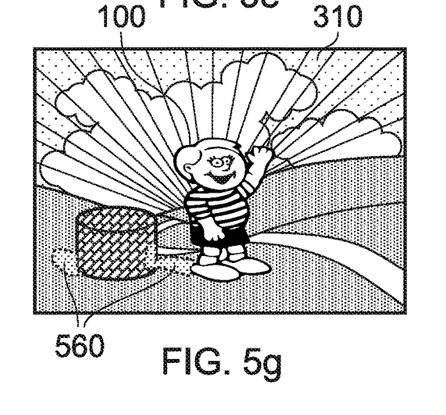

The result is that in the output image 310, shown in FIG. 5g, the subject 100 is superposed over the texture 335, which in turn is applied in place of the regions of the image 300 at which the key colour was detected. The effect of the transparency values 525 of FIG. 5d be applied to the foreground 540 over the texture background 535 of FIG. 5e is that at the shadow regions 520, the texture foreground 540 is made partially transparent such that the black or dark grey background 535 partly shows through, forming the impression of shadow regions 560 in the output image 310.

The processing described above involves directly detecting areas or regions of differential brightness in the key colour. In another example, this detection can be achieved by comparing a captured image to a reference image captured of the key colour background in the absence of any shadow-causing objects such as the subject 100. An example of this process is shown schematically in FIG. 6.

Figure 6:
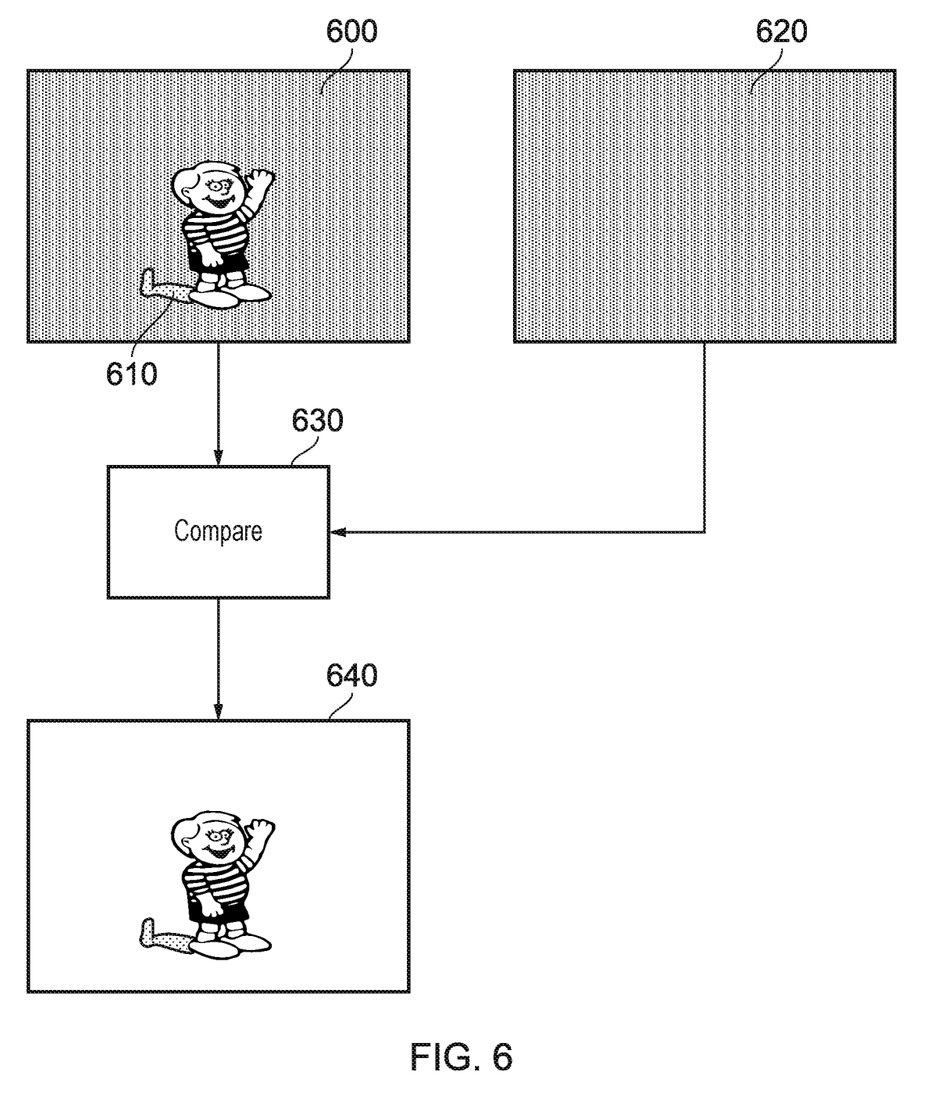
FIG. 6 schematically illustrates a comparison process.

Referring to FIG. 6, an image 600 is captured by the camera 130 of the subject 100 in front of the key colour background. As discussed above, this can include a shadow area 610.

A reference image 620 is provided of the background screen 110 in the absence of the subject 100. This can be captured before or after the capture of the image 600.

A comparator step or apparatus 630 compares the two images 600, 620. An example of such a comparison is a subtraction process and/or a division process, so as to at least partially cancel the effect of the captured key colour background.

The result is an output image 640 in which the predetermined key colour has been removed but the shadow areas 610 have been retained.

An advantage of the process in FIG. 6 can be that it compensates for any unevenness or irregularity in the screen 110, in that those irregularities are removed by the process at the step or apparatus 630.

Figure 7:
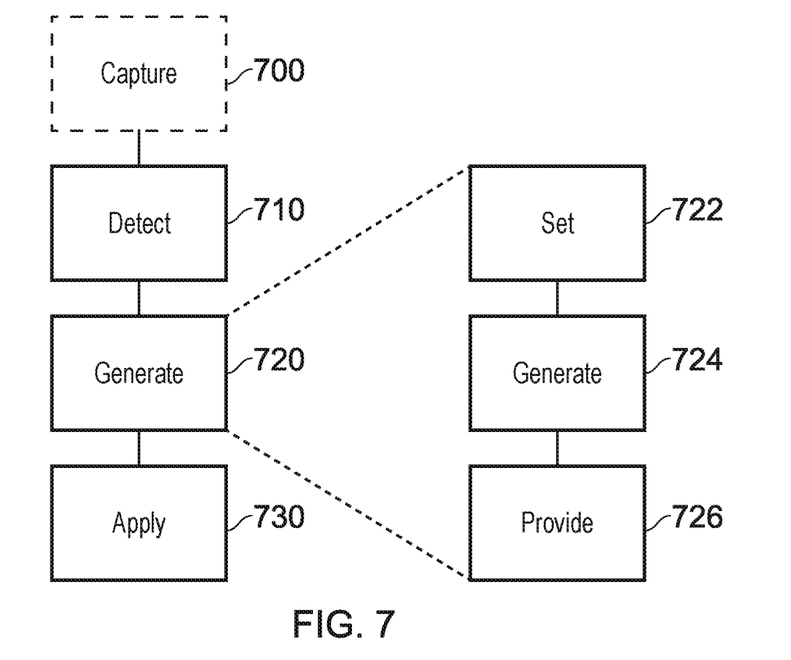
FIG. 7 is a schematic flowchart illustrating a method.

FIG. 7 is a schematic flowchart illustrating an image processing method comprising, at an optional first step 700, capturing an input image using a camera.

The method then comprises:

detecting, at a step 710, for image positions in an input image, the presence of a predetermined key colour;

generating, at a step 720 an image texture; and applying, at a step 730, the image texture to the input image at image positions at which the predetermined key colour is present.

For example, the generating step 720 may comprise:

setting (at a step 722) a texture background of the image texture to a predetermined background colour;

generating (at a step 724) transparency values at image positions of the image texture, the transparency value at an image position being dependent upon a detected property (such as brightness) of the predetermined key colour in the input image, the transparency values; and providing (at a step 726) a texture foreground of the image texture.

The detecting step 710 may (as discussed above) comprise at least partially cancelling, from the input image, the effect of the captured key colour background, for example by comparing the input image with a reference image of the key colour background.

Figure 8:
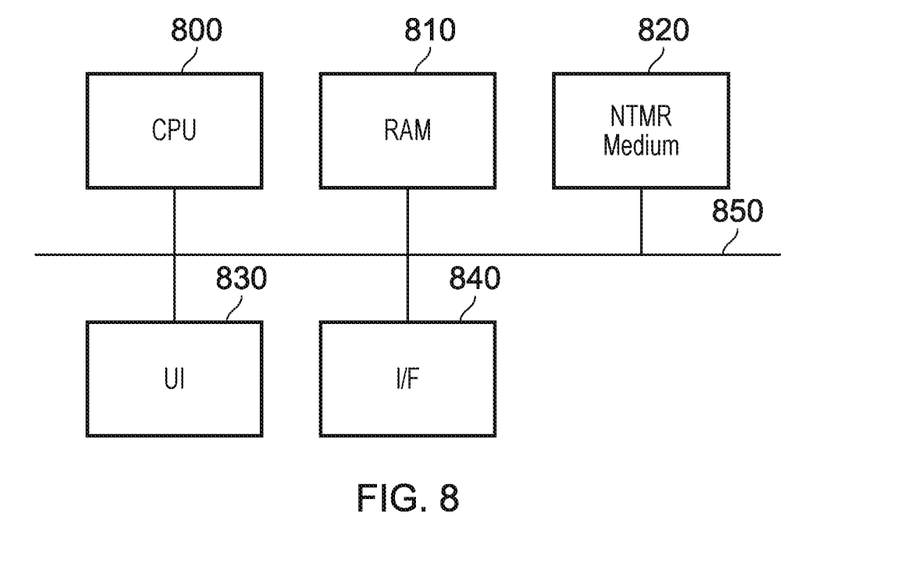
FIG. 8 schematically illustrates data processing apparatus.

FIG. 8 schematically illustrates a data processing apparatus suitable to carry out the methods discussed above and in particular to implement one or both of the auto-encoder and the classification system, comprising a central processing unit or CPU 800, a random access memory (RAM) 810, a non-transitory machine-readable memory or medium (NTMRM) 820 such as a flash memory, a hard disc drive or the like, a user interface such as a display, keyboard, mouse, or the like 830, and an input/output interface 840. These components are linked together by a bus structure 850. The CPU 800 can perform any of the above methods under the control of program instructions stored in the RAM 810 and/or the NTMRM 820. The NTMRM 820 therefore provides an example of a non-transitory machine-readable medium which stores computer software by which the CPU 800 perform the method or methods discussed above.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

The invention claimed is:

1. An image processing method comprising:
   detecting, for image positions in an input image, the presence of a predetermined key colour;
   generating an image texture, the generating step comprising:
   setting a texture background of the image texture to a predetermined background colour;
   generating transparency values at image positions of the image texture, the transparency value at an image position being dependent upon a detected property of the predetermined key colour in the input image; and
   providing a texture foreground of the image texture; and
   applying the image texture to the input image at image positions at which the predetermined key colour is present, wherein the applying includes:
   applying the texture background and the texture foreground; and
   setting a transparency of the texture foreground at an image position in response to the transparency value at that image position.

2. A method according to claim 1, in which the predetermined background colour is black.

3. A method according to claim 1, in which the step of setting the texture background comprises setting the texture background of the image texture to the predetermined background colour only at image positions at which the predetermined key colour is detected.

4. A method according to claim 3, in which the step of generating transparency values comprises setting the transparency value to indicate complete transparency at image positions at which the predetermined key colour is not detected.

5. A method according to claim 1, in which the providing step comprises executing a computer game program to generate the texture foreground representing a computer game environment.

6. A method according to claim 1, comprising capturing the input image using a camera.

7. A method according to claim 1, in which the detected property is brightness.

8. A method according to claim 1, in which the detecting step comprises comparing the input image with a reference image of the key colour background.

9. A machine-readable non-transitory storage medium which stores computer software, and which when executed by a computer, causes the computer to carry out actions, comprising:
- detecting, for image positions in an input image, the presence of a predetermined key colour;
- generating an image texture, the generating step comprising:
  - setting a texture background of the image texture to a predetermined background colour;
  - generating transparency values at image positions of the image texture, the transparency value at an image position being dependent upon a detected property of the predetermined key colour in the input image; and
  - providing a texture foreground of the image texture; and
- applying the image texture to the input image at image positions at which the predetermined key colour is present, wherein the applying includes:
  - applying the texture background and the texture foreground; and
  - setting a transparency of the texture foreground at an image position in response to the transparency value at that image position.

10. Apparatus comprising:
- a detector configured to detect, for image positions in an input image, the presence of a predetermined key colour;
- a texture generator configured: to generate an image texture by setting a texture background of the image texture to a predetermined background colour; and to generate transparency values at image positions of the image texture, the transparency value at an image position being dependent upon a detected property of the predetermined key colour in the input image; and to provide a texture foreground of the image texture; and
- a processor to apply the image texture to the input image at image positions at which the predetermined key colour is present, by applying the texture background and the texture foreground; and setting a transparency of the texture foreground at an image position in response to the transparency value at that image position.

11. Apparatus according to claim 10, comprising a camera to capture the input image.

12. Apparatus according to claim 11, comprising:
- a background screen of the predetermined key colour disposed so that an image subject is captured in front of the background screen;
- a lighting arrangement to illuminate the image subject.

* * * * *